Aug. 15, 1939.                J. P. BURKE                2,169,443
                          AIRPLANE UNDERCARRIAGE
                           Filed Dec. 13, 1937
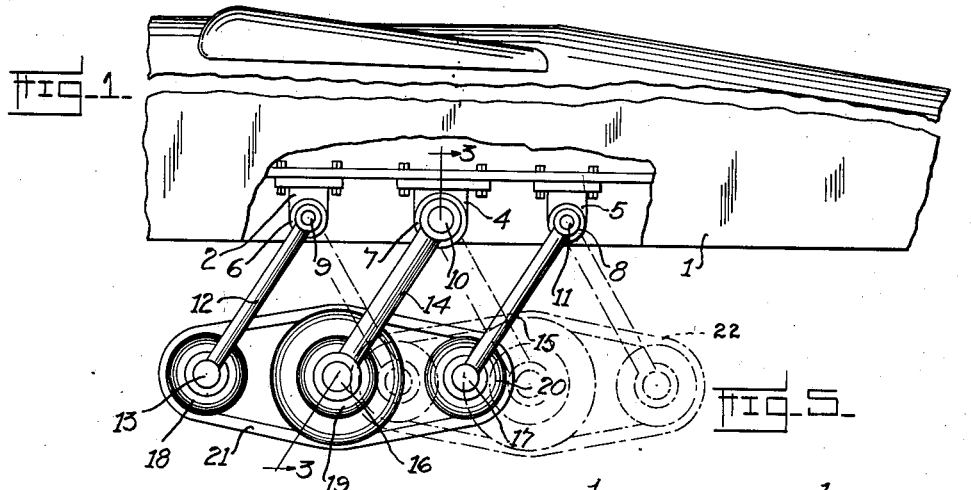
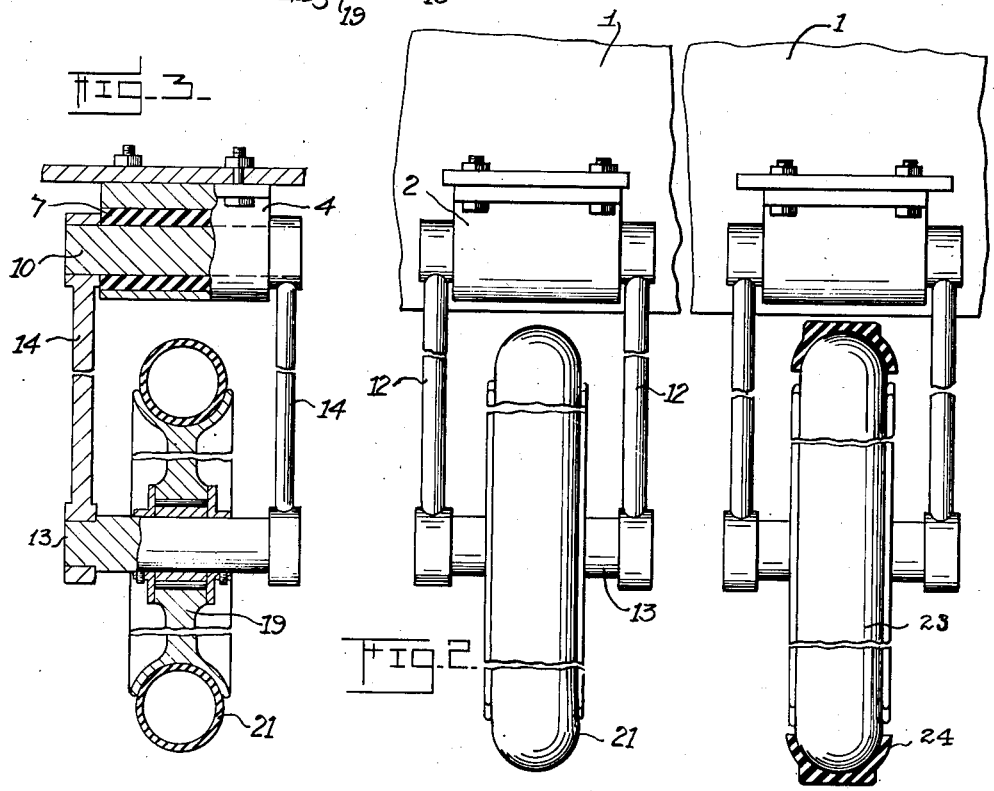
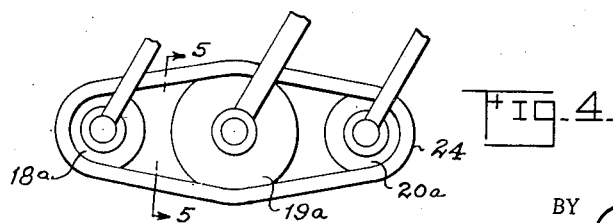
INVENTOR.
James P. Burke.

Patented Aug. 15, 1939

2,169,443

UNITED STATES PATENT OFFICE 2,169,443

AIRPLANE UNDERCARRIAGE

James P. Burke, Knoxville, Tenn.

Application December 13, 1937, Serial No. 179,384

16 Claims. (Cl. 244—100)

This invention relates to airplane and aircraft landing gear, and has for its object to provide a type of gear which will automatically adapt itself to various conditions of landing and of ground contour, in a manner promoting both comfort and safety in landing and in maneuvering the craft over the ground.

The invention also aims to provide a type of landing gear having a plurality of resiliently supported wheels, wherein at least one of the wheels is projected below the level of the other wheels to act as the main load-receiving member. It is also proposed to support each of the wheels on independent arms having a torsion spring mounting on the craft.

A further object is to provide a series of resiliently supported landing wheels with a common tractor tread member in the form of a continuous pneumatic tube or tire; a still further object being to secure a cooperative association between the resilient supports of the wheels and the continuous tire whereby such supports effect tension in the said tire about the wheels.

A still further object is to provide, in a landing gear having a series of wheels carrying a common tractor tire, for the projection of at least one of the intermediate wheels of the series below the level of other wheels of the series to depress the lower run of the said tire and form an angularity therein relative to the horizontal or to the road.

Still further objects subsidiary to the aforesaid objects, or resulting from the construction or operation of the invention as it may be carried into effect, will become apparent as the said invention is hereinafter further disclosed.

In carrying the said invention into effect, I may provide the novel construction and arrangement of parts hereinafter described, by way of example, having reference to the accompanying drawing, wherein:

Figure 1 is a broken side elevation of an airplane fuselage equipped with a landing gear embodying the said invention;

Figure 2 is an end elevation of the said landing gear;

Figure 3 is a detail sectional view taken along the line 3—3 in Figure 1.

Figure 4 is a side elevation of a modified form of my invention, and

Figure 5 is a vertical section taken along the line 5—5 of Fig. 4 and also showing the means for attachment to the fuselage.

Similar characters of reference indicate similar parts in the several figures of the drawing.

A fuselage 1 shown as having a series of three brackets 2, 4 and 5 suitably mounted thereon at spaced intervals longitudinally of the plane. These brackets are bored transversely of the airplane and are lined with rubber bushings 6, 7 and 8 suitably bonded thereto, several methods of such bonding being well known in the rubber working art. These bushings in turn carry and are bonded or secured to shafts 9, 10 and 11.

Fixedly mounted on and depending from the ends of the shaft 9 is a pair of arms 12 connected at their lower ends by an axle 13, the bushings 7 and 8 being similarly equipped with pairs of arms 14 and 15, respectively, which terminate in axle shafts 16 and 17.

On the shafts 13, 16 and 17 are mounted wheels 18, 19 and 20, respectively, the rims of which are hollow to receive a common tire 21 in the form of an endless pneumatic tube, the diameter of the wheel 19 being materially greater than that of the wheels 18 and 20 whereby the upper and lower runs of the said tire 21 are spread vertically insuring effective contact of the tire with intermediate wheel 19 and also providing a normal angularity of the lower run of the tire, with respect to the horizontal, in front of and to the rear of the said intermediate wheel 19.

The force exerted by the bushings 6, 7 and 8 on the upper shafts 9, 10 and 11 normally maintain the arms 12, 14 and 15 at an angle to the ground, as shown in Figure 1, with the axes of the wheels 18, 19 and 20 in substantially a common horizontal plane. The bushings, however, operate as torsion springs yieldingly permitting the upward and independent angular movement of the arms and of their corresponding wheels when the said wheels are subjected to vertical forces from contact with the ground on landing of the airplane; and the proportions of the various parts are intended to be such that the larger intermediate wheel will operate as the main load-carrying member when the airplane is on a substantially even keel, the other two wheels operating as secondary load-carrying members under such condition and taking their part of the burden when pressure on the intermediate wheel causes its axial elevation above the axes of the other wheels to reduce or even reverse the angularity of the lower run of the continuous pneumatic tire previously referred to.

Tipping of the plane forwardly will, of course, bring the forward wheel 18 into load-carrying position relative to the ground, irrespective of any such change in angularity of the continuous tire 21, as will be readily apparent, and irregularities in the ground contour will also be effective in bringing one or the other or both of the said smaller wheels 18 and 20 into load-carrying operation.

The continuous pneumatic tire will produce a tractor effect and its road contact will vary with the application of the load or applied forces, or the contour of the ground, a condition which would not apply in the same manner if the wheels were all of the same size.

The elastic nature of the endless pneumatic tire also does not confine the wheels 18 and 20 to the maintenance of strict axial spacing, the independent motion of the arms being, to that extent, therefore, unhampered and their ready accommodation to different forces is facilitated; and as the said endless tire may be mounted on the said wheels in a state of initial elastic tension opposed by the torsion springs, the security of the endless tire against displacement from the wheels such as under the influence of suddenly applied shocks may be ensured.

As a modification, the angularity of the arms 12, 14 and 15 with respect to the fuselage may be reversed as indicated by the dotted lines 22.

As a further modification, Figs. 4 and 5 illustrate a suspension similar to that previously described but differing therefrom in that the wheels 18a, 19a and 20a are each equipped with a conventional pneumatic tire 23 around all of which, on each side of the carriage, a single band or belt 24 is placed. This belt is preferably of elastic material and yieldable in a lengthwise direction.

This invention may be developed within the scope of the following claims without departing from the essential features of the said invention and it is desired that the specification and drawing be read as being merely illustrative and not in a limiting sense, except as necessitated by the prior art.

What I claim is:

1. In a landing gear of the type described, a support, a series of independently sprung wheels mounted on said support, and a pneumatic tire common to said wheels.

2. In a landing gear of the type described, a support, and a series of independently sprung wheels arranged in tandem and mounted on said support, at least one of the intermediate wheels of said series being of greater diameter than the front and rear wheels of said series and normally projecting below the said front and rear wheels, the axes of said wheels normally lying in the same horizontal plane.

3. In a landing gear of the type described, a support, a series of independently sprung wheels mounted on said support, the axes of said wheels normally lying in the same horizontal plane, at least one of the intermediate wheels of said series normally projecting above and below the level of the front and rear wheels of said series, and an endless tire common to said wheels.

4. In a landing gear of the type described, a support, a series of independently sprung wheels mounted on said support, at least one of the intermediate wheels of said series being of greater diameter than the front and rear wheels of said series and normally projecting above and below the said front and rear wheels, the axes of said wheels normally lying in the same horizontal plane and an endless tire common to said wheels.

5. In a landing gear of the type described, a support, a series of independently sprung wheels mounted on said support, at least one of the intermediate wheels of said series normally projecting above and below the level of the front and rear wheels of said series, and an endless pneumatic tire common to said wheels.

6. In a landing gear, in combination with an aircraft body, a series of torsion springs arranged one behind the other thereon, a series of arms carried by and depending at other than a vertical angle from said springs, landing wheels having their axes in the same horizontal plane carried by said arms, at least one of the intermediate wheels of the series being of greater diameter than the front and rear wheels of the series and normally projecting above and below the said front and rear wheels, an endless tire common to said wheels, said intermediate wheel serving as tire spacing means.

7. In a landing gear, in combination with an aircraft body, a series of torsion springs arranged one behind the other thereon, a series of arms carried by and depending at other than a vertical angle from said springs, landing wheels carried by said arms, at least one of the intermediate wheels of the series normally projecting above and below the level of the front and rear wheels of the series, and an endless pneumatic tire common to said wheels.

8. In a landing gear, in combination with an aircraft body, a series of torsion springs arranged one behind the other thereon, a series of arms carried by and depending at other than a vertical angle from said springs, landing wheels carried by said arms, at least one of the intermediate wheels of the series being of greater diameter than the front and rear wheels of the series and normally projecting above and below the said front and rear wheels, an endless pneumatic tire common to said wheels.

9. In combination in a vehicle suspension, a plurality of wheels arranged in tandem each having a tire receiving rim and a pneumatic tire residing jointly in all of said rims.

10. In a landing gear of the type described, wheel suspensory means, and a wheel suspensory lever having a wheel mounted on one end thereof and a torsion spring at the other end thereof, said suspensory lever forming an acute angle with a vertical line through the axis of said torsional spring.

11. In a caterpillar wheel assembly, a plurality of wheels arranged in tandem, a belt overriding each of said wheels and in contact with each thereof at its upper and lower flights, each of said wheels having a suspensory spring individual thereto, each of said wheels upon substantial springing movement causing a springing movement of at least one other of said wheels whereby the suspensory springs also serve as a belt tightener.

12. In a wheel suspension for a vehicle, a plurality of wheels arranged in tandem and having a common tire, a spring individual to each of said wheels, at least one of said wheels being independently movable vertically against its own spring by a predetermined amount, said belt causing the remainder of said springs to yieldingly resist vertical movement of said wheels greater than said predetermined amount whereby said wheel is subject to a variable spring rate.

13. In a wheel suspension for a vehicle, a plurality of wheels arranged in tandem and having a common tire, a spring individual to each of said wheels, at least one of said wheels being independently movable vertically against its own spring by a predetermined amount, said belt being in contact at both its upper and lower flight with all of said wheels whereby vertical movement of said wheel greater than said predetermined amount is subject to a variable spring rate.

14. In a landing gear of the type described, a support, a series of independently sprung wheels having their axes normally in the same horizontal plane mounted on said support, an endless tire common to said wheels, at least one of the intermediate wheels of said series being of greater diameter than the front and rear wheels of said series whereby the upper and lower runs of said tire are spread vertically by said intermediate wheel.

15. In a landing gear of the type described, a fuselage, a series of independently supported wheels mounted on said fuselage having their axes normally in the same horizontal plane, spring means permitting movement of each wheel independently of the other wheels of said series, at least one of the intermediate wheels being of greater diameter than the front and rear wheels of said series and serving as the primary load-carrying member, said front and rear wheels serving as secondary load-carrying members.

16. In a landing gear of the type described, a fuselage, a series of independently supported wheels mounted on said fuselage having their axes normally in the same horizontal plane, spring means permitting movement of each wheel independently of the other wheels of said series, at least one of the intermediate wheels being of greater diameter than the front and rear wheels of said series and serving as the primary load-carrying member, an endless tire common to all wheels in said series, said intermediate wheel normally maintaining the upper and lower runs of said tire inclined to the horizontal.

JAMES P. BURKE.